UNITED STATES PATENT OFFICE.

HENRY BEWLEY, OF DUBLIN, IRELAND.

IMPROVEMENT IN MAKING FLEXIBLE SYRINGES, TUBES, &c., OF GUTTA-PERCHA.

Specification forming part of Letters Patent No. 5,589, dated May 23, 1848.

*To all whom it may concern:*

Be it known that I, HENRY BEWLEY, of Dublin, Ireland, a subject of the Queen of Great Britain, have invented or discovered new and useful Improvements in Flexible Syringes, Tubes, Bottles, Hose, and other like Vehicles and Vessels; and I, the said HENRY BEWLEY, hereby declare that the nature of my said invention and in what manner the same is performed are particularly described in and by the present specification thereof.

First. I manufacture the said flexible syringes, tubes, hose, and other like vehicles wholly of gutta-percha in manner following: I either take the gutta-percha in a plastic state and press it into or upon and over molds of the shape or figure of the vehicle or vessel desired to be produced; or I apply it in a liquid state to the exterior surface of suitable molds, adding one coat after another till the requisite thickness has been obtained, and allowing each coat to dry before another is added, and in this case I make the mold of plaster or clay or some other material that will admit of its being broken up after the cast has been obtained; or I pour the gutta-percha in a liquid state into suitable molds and leave it to solidify; or I fill suitable molds with the substance in a granular state and subject these molds to a on subsequent cooling will be found to retain heat sufficient to liquefy the gutta-percha, which the exact shape or figure of the molds; or I cut sheet gutta-percha of a suitable thickness into strips or pieces of such given forms that when combined together vertically or horizontally or otherwise they will form the required vehicle or vessel, and join these strips or pieces together, either by overlapping and cementing, or by cementing them together edge to edge by heating the edges, or by coating them with a solution of gutta-percha or caoutchouc, or by compressing them strongly together; or, when making tubes, hose, and such like articles, I force gutta-percha in a plastic state through an apparatus such as is commonly used for making lead pipe, except that after passing out of the die in a formed state it should be cooled to prevent the inner surfaces from sticking together by collapsing, as the gutta-percha must be kept in a heated state during the process of forming the pipe. I also make tubes and hose by rolling one long strip of sheet gutta-percha round a mandrel in a spiral or other direction and cementing it together at the edges, as aforesaid, either by the application of heat or of a solution of gutta-percha or caoutchouc, or by passing the mandrel with the roll of gutta-percha wound upon it through grooved rollers or by immersing the mandrel with the gutta-percha wound upon it, as aforesaid, in hot water or subjecting it to the action of hot air for a sufficient time.

Should it be desired to give a polished or figured surface to any vessel which has been produced of a plain or dull exterior by any of the said methods, I introduce the vessel into a metal mold, made smooth or figured on the inside, as may be required, and force hot water or hot air into the interior of the vessel, so as to press it out against the inner face of the mold and into every line, hole, or indentation which there may be in it. Gutta-percha being a substance which is but little, if at all, affected by fat-oils or grease or acid fluids or alkaline fluids, it is peculiarly suitable for the construction of surgical instruments—as catheters, bougies, urinals, &c.

Secondly. I manufacture by the same processes as aforesaid—one or other of them—the said flexible syringes, tubes, hose, and other like vehicles and vessels of gutta-percha combined with other substances, one, two, or more—as, for example, combined with cloth or leather, or mixed with more or less of caoutchouc or sulphur or French chalk or ground emery or asphalt, according as the articles are required to be made softer or harder, or cheaper, or otherwise modified. And sometimes, also, I substitute for the sulphur in such combinations an equal quantity of calamine reduced to a powder, or use equal portions of sulphur and calamine.

Thirdly. I use the gutta-percha, both in the simple and mixed states before described, as a coating for flexible syringes, tubes, hose, and other like vehicles and vessels made in the body thereof of other substances—as caoutchouc, leather, cloth, &c.—in order to render the same impervious to water or to enable them to resist the action of grease and oils or of acid or alkaline fluids, and I apply the same either to both the inside and outside or to the outside only, or to the inside only. The articles may be dipped in a solution of gutta-percha, or the gutta-percha may be laid on with a brush or sponge in a liquid state and in one or more coats, as may be judged expedient, or it may be applied in sheets cemented to the articles by a solution of gutta-percha or of caoutchouc and joined at the edges by any of the means before described under the first head of this specification. Tubes and hose of other materials, as aforesaid, may also have a continuous sheathing of gutta-percha without joint or break given to them in manner following. The tubes and hose are passed through the holes of a steam draw plate or box similar to those used by lead-pipe makers for drawing lead pipes, and these holes, which are of a conical form, with the broad end innermost, and are in their least diameter a little larger than the tubes or hose, are kept supplied with gutta-percha in a soft or nearly semi-fluid state, so that as the tubes or hose are drawn through the mass of gutta-percha they carry a sheathing of the stuff along with them. To make the gutta-percha flow kindly, the steam plate or box should be kept at a temperature of about 230°.

Fourthly. When caoutchouc has been employed merely as a coating for flexible syringes, tubes, bottles, hose, and other like vehicles and vessels made of some other material or materials than caoutchouc, I superimpose upon it internally or externally a coating of gutta-percha, and thereby obviate the stickiness and susceptibility to the action of grease and oils which belong to the caoutchouc in the unprotected state. In this case the gutta-percha is best added in a liquid state, and a thin layer of it will suffice.

Fifthly. Should any of the flexible syringes, tubes, bottles, hose, and other like vehicles and vessels manufactured by any of the processes aforesaid from gutta-percha in the simple or mixed state require to have more or less flexibility given to them, I subject them in their manufactured state to the action of sulphur, either by dipping them in a bath of hot sulphur or exposing them to the fumes of burning sulphur.

Sixthly. I make the said flexible syringes, tubes, bottles, hose, and other like vehicles and vessels of a great variety of colors by mixing with the gutta-percha in the simple or mixed state aforesaid employed in the construction thereof, and however the same may be employed, the pigments or other matters suitable for imparting such colors. The gutta-percha is heated for these purposes by any of the known modes.

Pipes, tubes, and other hollow articles herein referred to differ from similar articles made of other substances in so many important particulars as to constitute them entirely new manufactures of great value—as, for instance, they differ from similar articles made of india-rubber in being of sufficient stiffness to retain their form, while they admit of bending to adapt them to the various purposes required. Their surfaces are not tacky, and therefore do not require to be vulcanized, as in the case of india-rubber, the process of vulcanizing not being applicable to such articles. They are not injuriously affected by oleagenous and fatty substances or by alkali liquids, and will not injuriously affect liquids or other substances contained or carried through them. They will sustain without essential change of form great pressures, and they admit of being united by simply heating and pressing together the surfaces to be united; and they differ from such articles made of lead in being formed with more ease and less cost, in being much less ponderous, in being easily bent and readily united, and in not being affected chemically by substances and agents known to be very injurious, not only to lead, but to the liquids to be contained or carried through, and at the same time gutta-percha admits of being compounded with various substances to a degree and under circumstances not admissible with lead or other metals.

Having now described the nature of my said invention and in what manner the same is to be performed, I declare what I claim is—

The application of gutta-percha in any of the states and by any of the processes before specified to the manufacture of flexible syringes, tubes, bottles, hose, or other like vehicles or vessels, or to the improvement of such articles after manufactured, as aforesaid.

HENRY BEWLEY.

Witnesses:
 THOS. I. OLDHAM,
 THOS. WM. KENNY.